United States Patent [19]

Koschmieder et al.

[11] 3,804,203

[45] Apr. 16, 1974

[54] NOVEL LUBRICATING MEANS

[75] Inventors: Hartmut Koschmieder, Erlangen; Armin Olschewski, Schweinfurt; Hans-Dieter Paschke, Erlangen-Bruck; Wolfgang Pflugner; Jurgen Rabe, both of Herzogenaurach, all of Germany

[73] Assignee: Industriewerk Schaeffler, OHG, Herzogenaurach, Germany

[22] Filed: June 2, 1972

[21] Appl. No.: 258,970

[30] Foreign Application Priority Data
June 18, 1971   Germany.............................. 2130420

[52] U.S. Cl................... 184/64, 184/102, 308/36.5
[51] Int. Cl............................................. F16n 1/00
[58] Field of Search................... 308/36.5, 5 R, 3.5; 184/64, 24, 21, 25, 5, 100, 102; 277/24

[56] References Cited
UNITED STATES PATENTS
342,486   5/1886   Walker............................. 308/36.5
215,508   5/1879   Covel............................... 308/36.5
2,699,843   1/1955   Peters................................... 184/24

FOREIGN PATENTS OR APPLICATIONS
990,019   5/1951   France................................ 184/24

Primary Examiner—Manuel A. Antonakas
Attorney, Agent, or Firm—Hammond & Littell

[57]   ABSTRACT

A novel lubrication means for bearing elements, preferably roller bearings longitudinally moveably mounted on a bearing surface or on a structural member which is longitudinally moveably mounted, the said bearing element being provided with on at least one face a stripper means resting on the race on the surface of the structural member to keep dirt and other foreign matter from the rollers. One type of roller bearing may be a roller circulating housing or a cylindrical casing.

5 Claims, 3 Drawing Figures

NOVEL LUBRICATING MEANS

STATE OF THE ART

In known roller bearings of this type, constant relubrication is required because the stripping means not only removes foreign matter from the race but also the lubricant and if relubrication is not effected, the bearing will run dry after a short time with the known consequences. However, known means for permanent or constant relubrication are very expensive.

OBJECTS OF THE INVENTION

It is an object of the invention to provide a simple and inexpensive constant lubricating means for a bearing.

It is a further object of the invention to provide a roller bearing equipped with means for constant even lubrication and a stripping means.

These and other objects and advantages of the invention will become obvious from the following detailed description.

THE INVENTION

The lubricating means of the invention for a bearing longitudinally moveably mounted on a race or on the surface of a structural member and provided on at least one face with a stripping means resting on the race or structural member is comprised an element made of absorbent material disposed to absorb the lubricant removed by the stripping means and to transfer the said lubricant to the bearing behind the stripping means. The transfer of the lubricant can be to the rollers or to the race or the structural member surface.

In this fashion, the lubricant on the race is scraped up and not removed as in the prior art but is transferred to the rollers or race at the point where lubrication is required. This avoids the necessity for a permanent relubrication means.

The absorbent element may be made of absorbent material such as sintered metal, wick material, sponge rubber, etc. and it is preferably resiliently pressed against the race or the surface of the structural member. In a modification of the invention, the absorbent element is resiliently pressed against the surface of the stripping means to be able to positively receive and absorb the lubricant as it is scraped from the surface. Thereby, the absorbent element may end at a distance from the scraping edge of the stripping means and in this case it is desirable for the absorbent element to be connected with the scraping edge by capillary canals in the surface of the stripping means. The scraped-up lubricant, preferably oil, rises in these capillaries and is soaked up by the absorbent element. The capillaries are particularly useful in bearings having relatively slow movements wherein the bow swell of lubricant in front of the stripping means is very weak and the oil is therefore drawn up to the absorbent element by capillary action of the canals.

A spring element ending at a short distance from the race or the surface of the structural member may be provided for applying pressure on the absorbent element and it may therefore act as a pre-stripping means for coarse particles.

The lubricant can be applied to the race or the surface of the structural member by a drip-oiler, a lubricating device or manually and it is particularly advantageous to provide a lubricant reservoir at an easily accessible location which brings lubricant directly to the race or the surface of the structural member through an absorbent element. The lubricant reservoir may be filled with an absorbent material to achieve a lubricant supply independent of the location.

Referring now to the drawings

Figure 1:
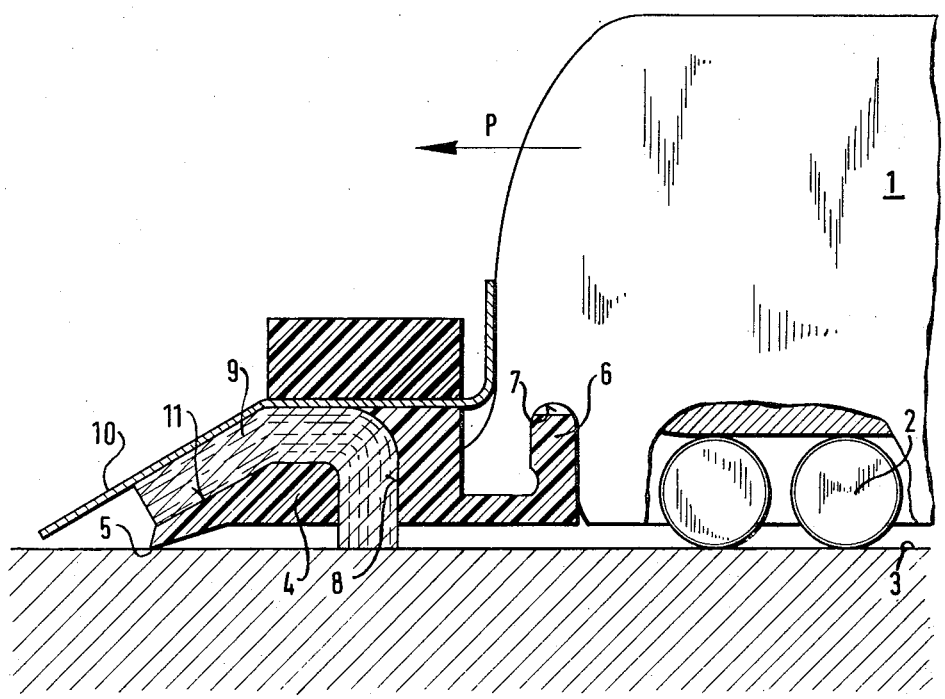
FIGS. 1 and 2 are partial cross-sectional views of two similar lubricating means of the invention mounted on the face of a roller circulating housing.

In the embodiment of FIG. 1, the roller circulating housing 1 moves back and forth on rollers 2 rolling on a planar race 3. The housing 1 is provided front and back (only one shown) with a stripper 4 which has its scraping edge 5 resting on race 3 which scrapes foreign matter off race 3 and keeps it from the rollers 2. The stripper 4 may be made of plastic and is provided on rearward edge with a projection 6 which is held in a cooperating groove 7 in the roller circulating housing 1. The stripper 4 is provided with a channel 8 in which is disposed an absorbent element 9 in the form of a wick, for example. The absorbent element 9 terminates on one side in an area to which the scraped-up lubricant is transferred to by scraping edge 5 and terminates on the other side on race 3 behind the scraping edge 5. Adjacent the scraping edge 5, the absorbent element 9 is pressed against the sloped surface 11 of stripper 4 by resilient element 10 in the form of a spring plate. The resilient element 10 ends a short distance from race 3 to serve as a pre-stripper for coarse particles. The lubricant on race 3 in front of scraping edge 5 is taken from edge 5 by absorbent element 9 by movement of housing 1 in the direction of arrow P and transferred by element 9 to race 3 behind scraping edge 5.

In this embodiment, resilient element 10 may be injection molded into plastic stripper 4 but may also together with the absorbent element 9 form a single structural element which can be connected to stripper 4. Also, stripper 4 and resilient element 10 can be made as a part of housing 1.

Figure 2:
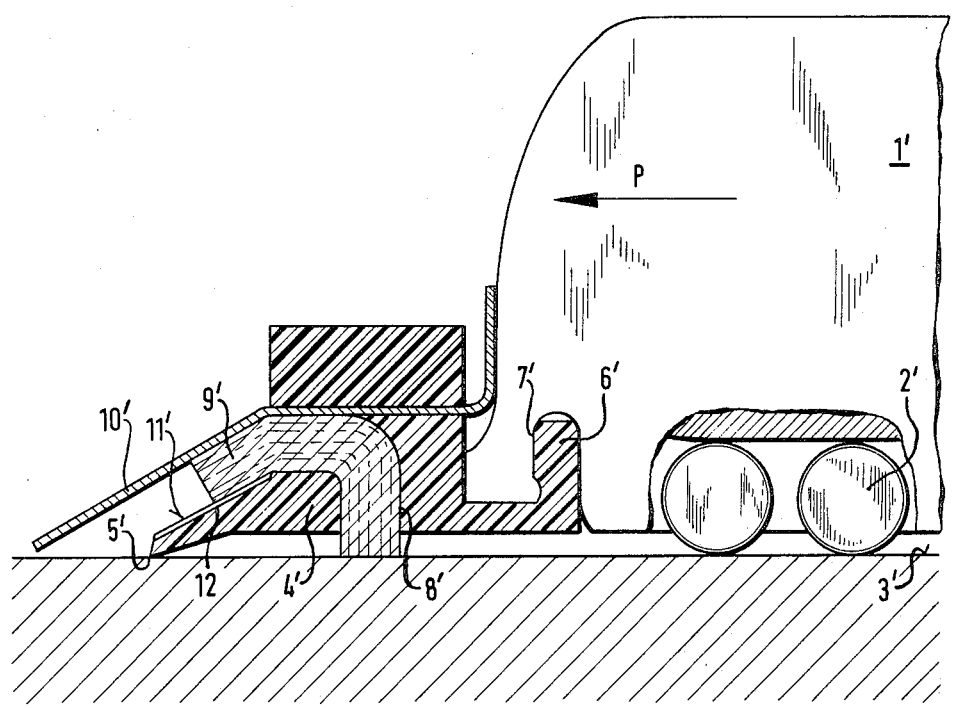

In the embodiment of FIG. 2, the main difference from the embodiment of FIG. 1 is that the leading end of absorbent element 9' terminates at a distance from edge 5' of scraper 4' and capillary canals 12 are arranged in sloping surface 11'. The lubricant on race 3' is picked up by edge 5' of scraper 4' and is carried by capillaries 12 up sloping surface 11' to absorbent element 9' and is finally transferred to race 3' behind edge 5'. The lubricant, when housing 1' is moved slowly, may not move up sloping surface 11' to absorbent element 9' so capillaries 12 are provided to move the lubricant by capillary action.

Figure 3:
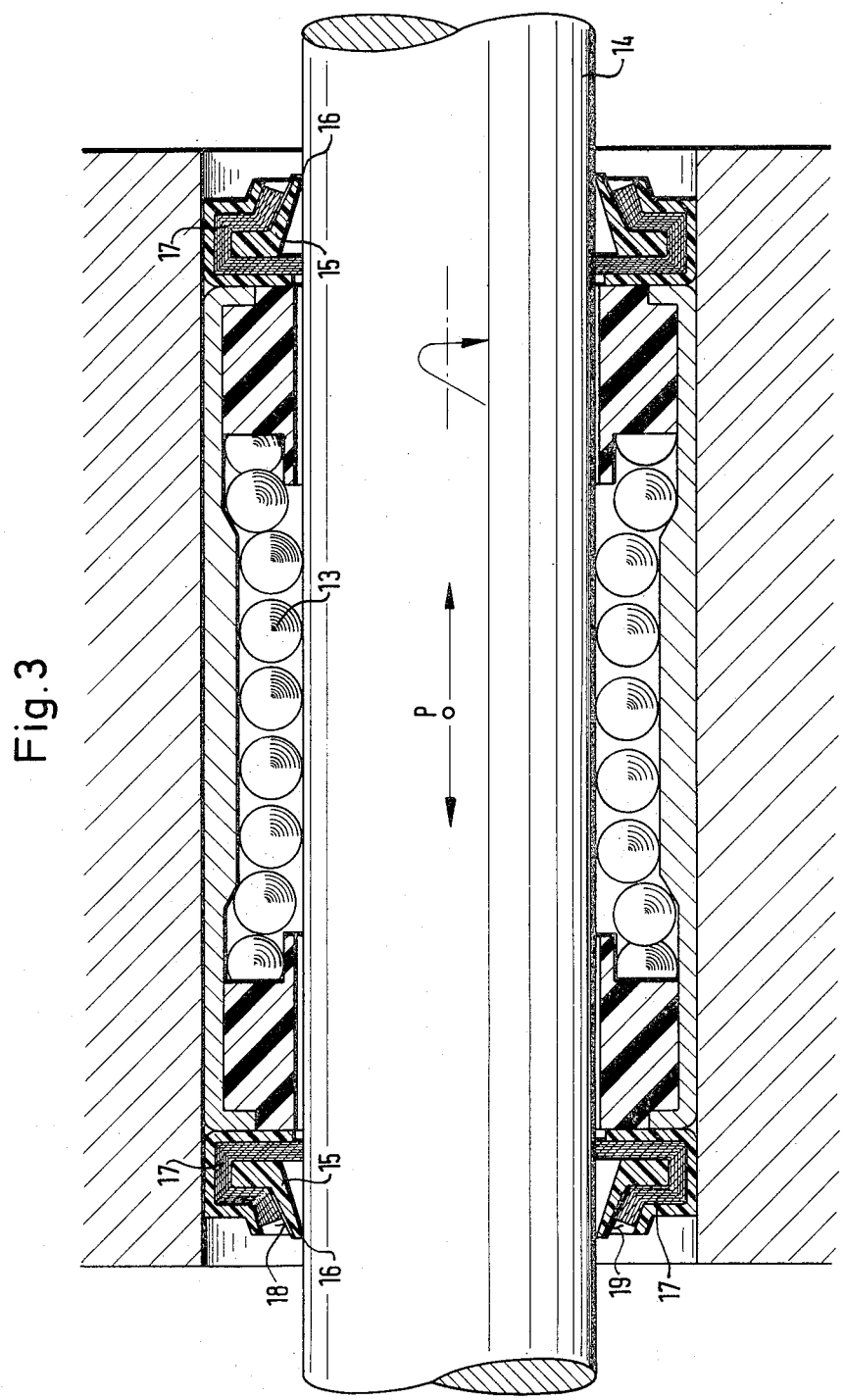
FIG. 3 is a cross-sectional view of a lubricating means of the invention for a roller bearing in which a structural member is mounted for longitudinal movement.

In the embodiment of FIG. 3, a longitudinally moveable shaft 14 is mounted in a stationary roller bearing 13 which may be in the form of a cylindrical casing provided at each end with a ring-like stripper 15 resting with its scraping edge 16 on the surface of shaft 14. Stripper 15 has disposed therein an absorbent element 17 with one end resting on sloping surface 18 of stripper 15 and the other end contacts the surface of shaft 14 behind scraping edge 16. The lubricant taken up by edge 16 moves onto the sloping surface 18 when the shaft is moved in the direction P and contacts the absorbent element 17 which transfers the lubricant to the surface of shaft 18 just in front of roller bearing 13. Capillary canals 19 may be provided in sloping surface 18 as in FIG. 2, if desired.

Various modifications of the lubricating means of the invention may be made without departing from the spirit or scope thereof and it is to be understood that the invention is to be limited only as defined in the appended claims.

We claim:

1. A lubricating means for a longitudinally moveable bearing mounted on a race or on the surface of a structural member comprising a bearing element provided on at least one face with a stripping means resting on the race or structural member, and an element made of absorbent material disposed to absorb the lubricant removed by the stripping means and to transfer the said lubricant to the bearing behind the stripping means.

2. The lubricating means of claim 1 wherein the absorbent element is resiliently pressed against the race or surface of the structural member.

3. The lubricating means of claim 1 wherein the absorbent element is resiliently pressed against the surface of the stripping means.

4. The lubricating means of claim 2 wherein the absorbent element is resiliently pressed by a resilient member ending a short distance from the race or surface of the structural member to act as a pre-stripper.

5. A lubricating means of claim 1 wherein the absorbent element ends at a distance from the edge of the stripping means and the edge of the stripping means and the absorbent element are connected by capillaries on the surface of the stripping means to transport taken up lubricant from the stripping means to the absorbent element.

* * * * *